(12) United States Patent
Chono (10) Patent No.: US 7,835,438 B2
(45) Date of Patent: Nov. 16, 2010

(54) METHOD AND DEVICE FOR ENCODING MOVING PICTURE USING REFERENCE FREQUENCY OF REFERENCE FRAME

(75) Inventor: Keiichi Chono, Tokyo (JP)

(73) Assignee: NEC Corporation, Tokyo (JP)

( * ) Notice: Subject to any disclaimer, the term of this patent is extended or adjusted under 35 U.S.C. 154(b) by 1316 days.

(21) Appl. No.: 10/562,789

(22) PCT Filed: Dec. 20, 2004

(86) PCT No.: PCT/JP2004/019005

§ 371 (c)(1),
(2), (4) Date: Dec. 29, 2005

(87) PCT Pub. No.: WO2005/062625

PCT Pub. Date: Jul. 7, 2005

(65) Prior Publication Data

US 2006/0159174 A1 Jul. 20, 2006

(30) Foreign Application Priority Data

Dec. 22, 2003 (JP) .............................. 2003-424028

(51) Int. Cl.
  *H04N 7/32* (2006.01)
  *H04N 7/50* (2006.01)
(52) U.S. Cl. ..................... 375/240.12; 375/240.16; 375/240.18; 375/240.23
(58) Field of Classification Search ............ 375/240.12, 375/24.16, 240.18, 240.23; 382/236, 238, 382/246, 248
See application file for complete search history.

(56) References Cited

U.S. PATENT DOCUMENTS

| 6,091,460 | A | 7/2000 | Hatano |
| 6,480,670 | B1 | 11/2002 | Hatano |
| 7,733,960 | B2 | 6/2010 | Kondo et al. |
| 2002/0114392 | A1 | 8/2002 | Sekiguchi et al. |

FOREIGN PATENT DOCUMENTS

| JP | 07-274182 | 10/1995 |
| JP | 08-275139 | 10/1996 |
| JP | 11-285007 | 10/1999 |
| JP | 2001-103485 | 4/2001 |
| JP | 2003-189313 | 7/2003 |
| WO | WO 98/36576 | 8/1998 |
| WO | WO 03/090473 A1 | 10/2003 |

*Primary Examiner*—Scott A Rogers
(74) *Attorney, Agent, or Firm*—Foley & Lardner LLP (57) ABSTRACT

A moving picture encoding method capable of using a reference frame number in multi-frame motion prediction and variable-length code reference frame information corresponding to the number includes the steps of: calculating a reference frequency of the reference frame; acquiring, with the reference frequency, reference frame identification information so that a ratio of a reference frame index code occupying a bit stream is reduced; and multiplexing the reference frame identification information together with encoded moving picture data. Instead of the calculation of the reference frequency, the reference frequency of the reference frame may be estimated by calculating a frame similarity.

18 Claims, 12 Drawing Sheets

| frame_num(r) | ref_index | m_ref_index | | |
|---|---|---|---|---|
| | | Example 1 | Example 2 | Example 3 |
| 104 | 1 | 1 | 3 | 1 |
| 103 | 2 | 2 | 4 | 2 (NUM(2)=0) |
| 102 | 3 | 3 | 1 | 3 (NUM(3)=0) |
| 101 | 4 | 4 | 2 | 4 (NUM(4)=0) |

FIG. 6

| frame_num | ref_index | Variable-length code |
|---|---|---|
| 104 | 1 | 0 |
| 103 | 2 | 10 |
| 102 | 3 | 110 |
| 101 | 4 | 1110 |

FIG. 7A

| frame_num | ref_index | Variable-length code |
|---|---|---|
| 104 | 3 | 110 |
| 103 | 4 | 1110 |
| 102 | 1 | 0 |
| 101 | 2 | 10 |

$$[H_2] = \frac{1}{\sqrt{2}}\begin{bmatrix} 1 & 1 \\ 1 & -1 \end{bmatrix}$$

$$[H_4] = \frac{1}{\sqrt{2}}\begin{bmatrix} H_2 & H_2 \\ H_2 & -H_2 \end{bmatrix}$$

$$[H_8] = \frac{1}{\sqrt{2}}\begin{bmatrix} H_4 & H_4 \\ H_4 & -H_4 \end{bmatrix}$$

$$\vdots$$

$$[H_{2^n}] = \frac{1}{\sqrt{2}}\begin{bmatrix} H_{2^{n-1}} & H_{2^{n-1}} \\ H_{2^{n-1}} & H_{2^{n-1}} \end{bmatrix}$$

METHOD AND DEVICE FOR ENCODING MOVING PICTURE USING REFERENCE FREQUENCY OF REFERENCE FRAME

TECHNICAL FIELD

The present invention relates to a moving picture encoding technique, and more particularly to a technique for controlling a code amount in moving picture encoding in which multi-frame motion prediction is performed.

BACKGROUND ART

Figure 1:
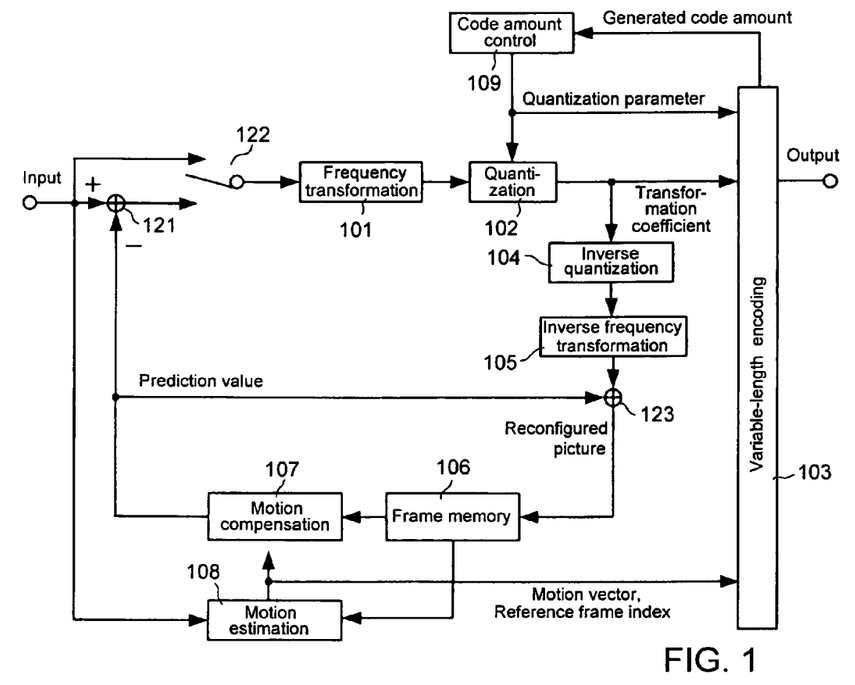
FIG. 1 is a block diagram illustrating the constitution of a conventional typical encoding apparatus for encoding a moving picture signal.

FIG. 1 is a block diagram of a conventional typical encoding apparatus for encoding a moving picture signal.

The encoding apparatus shown in FIG. 1 includes a local decoding device and is provided with frequency transformation unit 101, quantization unit 102, variable-length encoding unit 103, inverse quantization unit 104, inverse frequency transformation unit 105, frame memory 106, motion compensation unit 107, motion estimation unit 108, and code amount control unit 109. The encoding apparatus is also provided with subtracter 121, switch 122, and adder 123.

An input picture frame is supplied to the encoding apparatus and is divided into a plurality of blocks. When inter-frame prediction is used, prediction values described later are subtracted from the divided blocks by subtracter 121.

The inter-frame prediction is a method for predicting a current frame using a picture frame which is previously reconfigured. An input block from which the prediction value is subtracted is called a prediction error. It should be noted that a picture frame in which all blocks in an encoding frame are encoded only by intra-frame prediction for producing prediction values from adjacent pixels in the same encoding frame is called I picture. A picture frame in which all blocks are encoded by using the intra-frame prediction and the inter-frame prediction is called P picture. Also, in the inter-frame prediction, a picture frame encoded by referring to a plurality of reconfigured frames inputted previously and subsequently to the current encoding frame is called B picture.

In general, in encoded moving picture data, I pictures are set in a constant cycle, and a section including a plurality of frames divided by the I picture is call a GOP (Group Of Picture). These definitions of the I, P, and B pictures and the GOP are used in MPEG (Motion Picture Expert Group) scheme which is a moving picture encoding standard of the international standardization.

Then, the input block in which the prediction value is subtracted is transformed into a frequency domain by frequency transformation unit 101. The input block transformed into the frequency domain is quantized by quantization unit 102. The quantized input block, namely, a transform coefficient is entropy-encoded by variable-length encoding unit 103 and outputted. Switch 122 is provided to switch whether the inter-frame prediction is performed or not. When the inter-frame prediction is not performed, through switch 122, an input block in which no prediction value is subtracted is directly given to frequency transformation unit 101.

A quantized prediction error is returned to a prediction error in an original spatial domain by inverse quantization unit 104 and inverse frequency transformation unit 105 as a local decoding process. Further, the prediction value is added to the prediction error returned to the spatial domain by adder 123, and is stored in frame memory 106 as a reconfigured picture.

The reconfigured picture stored in frame memory 106 is referred by motion compensation unit 107 and motion estimation unit 108 in order to produce a prediction value. Accordingly, the reconfigured picture stored in frame memory 106 is also called a reference frame.

Motion compensation unit 107 produces the prediction value from the reference frame stored in frame memory 106 using a motion vector and a reference frame index supplied from motion estimation unit 108. Motion estimation unit 108 detects the motion vector of the input block and the reference frame index indicating a frame number to be referred so as to make a difference between the input block and the prediction value, namely, the prediction error smallest.

A bit stream which is moving picture information compressed by the above-mentioned process is a variable-length code mainly including a transform coefficient, a quantization parameter, a motion vector, and a reference frame index of each block.

Now, generally, in a digital broadcasting system, a picture communication service, or the like, a generated code amount of moving picture signals, namely, a bit rate is controlled for transmission and storage. So, the code amount control unit 109 monitors the generated code amount supplied from the variable-length encoding unit 103, and makes the quantization parameter larger to decrease the transform coefficient when the generated code amount is likely to exceed a target bit rate, and makes the quantization parameter smaller to increase the transform coefficient when the generated code amount is likely to be below the target bit rate. With this operation, the generated code amount is controlled in the conventional moving picture encoding technique.

Usually, in order to encode a fixed information amount of moving pictures of high picture quality, it is more preferable to increase a ratio of an information amount of the transform coefficient included in the bit stream. As its reasons, the transform coefficient is just information representing the texture of the picture.

DISCLOSURE OF INVENTION

Problems to be Solved by the Invention

However, in the above-mentioned conventional moving picture encoding technique, the target bit rate is achieved by simply varying the quantization parameter. Accordingly, when moving pictures are encoded at a low bit rate, in order to achieve the target bit rate, the quantization parameter is simply made larger to decrease the transform coefficient, and encoded moving pictures quality is lowered.

An object of the present invention is to provide a code amount control technique in moving picture encoding, capable of decreasing the reference frame index code amount occupying the bit frame without lowering picture quality.

Another object of the present invention is to provide a moving picture encoding method capable of decreasing the reference frame index code amount occupying the bit frame without lowering picture quality.

A further object of the present invention is to provide a moving picture encoding apparatus capable of decreasing the reference frame index code amount occupying the bit frame without lowering picture quality.

Means for Solving the Problems

According to a first aspect of the present invention, a moving picture encoding method capable of using a reference frame number in multi-frame motion prediction and variable-length code reference frame information corresponding to the number, comprises the steps of: acquiring a reference frequency of the reference frame; with the reference frequency, acquiring reference frame identification information so that a ratio of a reference frame index code occupying a bit stream is reduced; and multiplexing the reference frame identification information together with encoded moving picture data.

According to a second aspect of the present invention, a moving picture encoding apparatus capable of using a reference frame number in multi-frame motion prediction and variable-length code reference frame information corresponding to the number, includes: reference frame identification information calculation means for calculating a reference frequency of the reference frame and for acquiring, with the reference frequency, reference frame identification information so that a ratio of a reference frame index code occupying a bit stream is reduced; and multiplexing means for multiplexing the reference frame identification information together with encoded moving picture data.

According to a third aspect of the present invention, a moving picture encoding apparatus capable of using a reference frame number in multi-frame motion prediction and variable-length code reference frame information corresponding to the number, includes: reference frame identification information calculation means for calculating a frame similarity to estimate a reference frequency of the reference frame and for acquiring, with the reference frequency, reference frame identification information so that a ratio of a reference frame index code occupying a bit stream is reduced; and multiplexing means for multiplexing the reference frame identification information together with encoded moving picture data.

According to the present invention, in the moving picture encoding apparatus capable of using a number of a reference frame to be referred and variable-length code reference frame information corresponding to the number in the multi-frame motion prediction, the reference frequency of the reference frame is calculated or estimated, thereby producing reference frame identification information from the reference frequency so that a ratio of the reference frame index occupying the bit stream is as small as possible. Then, the reference frame identification information is multiplexed together with the bit stream. With this operation, the ratio of transform coefficient occupying the bit stream becomes large and the quantization parameter becomes small. Therefore, moving pictures can be encoded with high picture quality.

It should be noted that the reference frequency may be calculated by the reference frame selected by the prediction error and a weighted sum of the motion vector obtained by the motion estimation. Alternatively, the reference frequency may be estimated by a frame similarity using an orthogonal transformation coefficient extracted from the picture frame. The orthogonal transformation coefficient is a characteristic amount of a picture, which can be obtained without motion estimation. Therefore, according to the method using the frame similarity, the reference frame identification information can be calculated with a smaller computation amount.

BEST MODE FOR CARRYING OUT THE INVENTION

Figure 2:
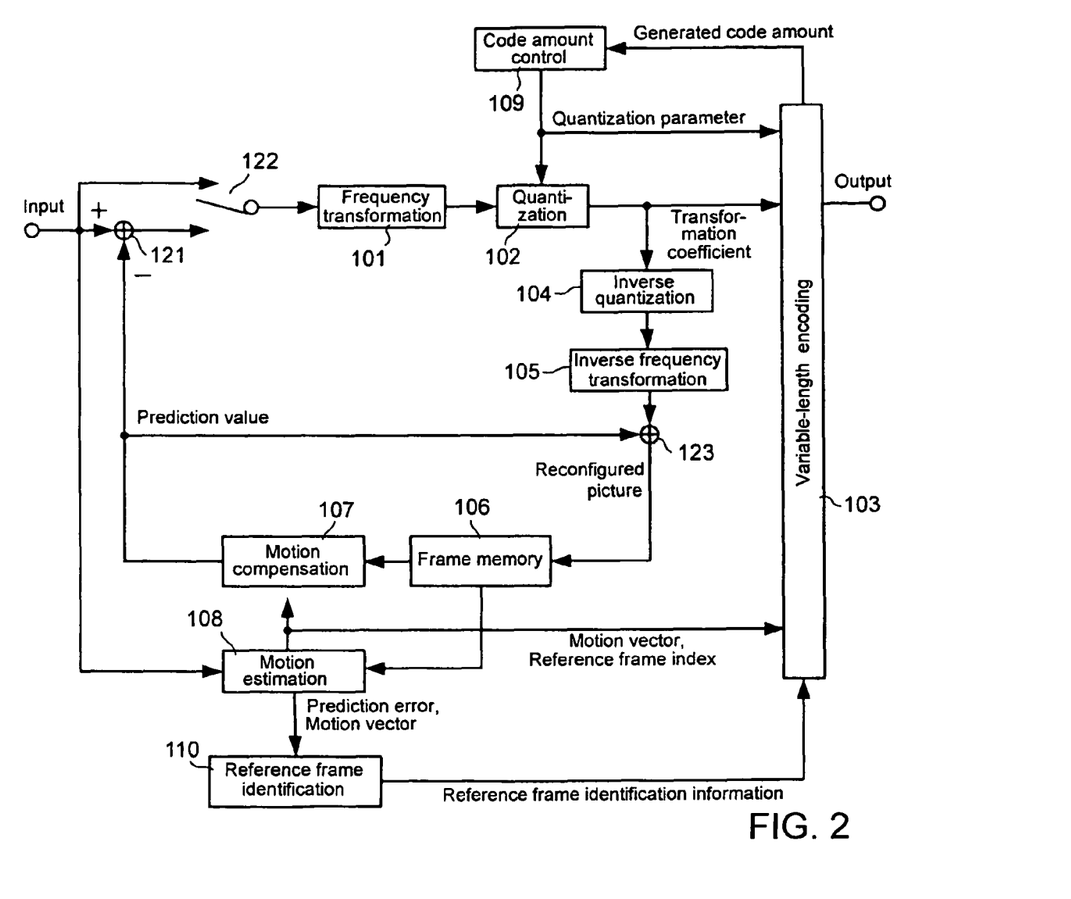
FIG. 2 is a block diagram illustrating the constitution of a moving picture encoding apparatus according to a first embodiment of the present invention.

A moving picture encoding apparatus according to the first embodiment of the present invention shown in FIG. 2 is further provided with reference frame identification unit 110 in addition to the encoding apparatus shown in FIG. 1. Variable-length encoding unit 103 determines a variable-length code corresponding to the reference frame index based on the reference frame identification information supplied from reference frame identification unit 110. In FIG. 2, the same numeral references are given to the same elements as those in FIG. 1, and detailed explanations of those are omitted.

Hereinafter, explanations will be given of reference frame identification unit 110 and variable-length encoding unit 103 which are distinctive of the moving picture encoding apparatus according to the present embodiment.

Reference frame identification unit 110 calculates a similarity between a frame to be encoded and the reference frame using the motion vector and the prediction error supplied from motion estimation unit 108, and generates reference frame identification information using non-reference frequency obtained from the similarity.

The reference frame identification information includes a number NUM_REF of reference frames used for the motion prediction of the frame to be encoded and change reference frame index m_ref_index[MAX_REF] corresponding to a frame number frame_num to be referred. MAX_REF indicates a maximum number of reference frames.

Figure 3:
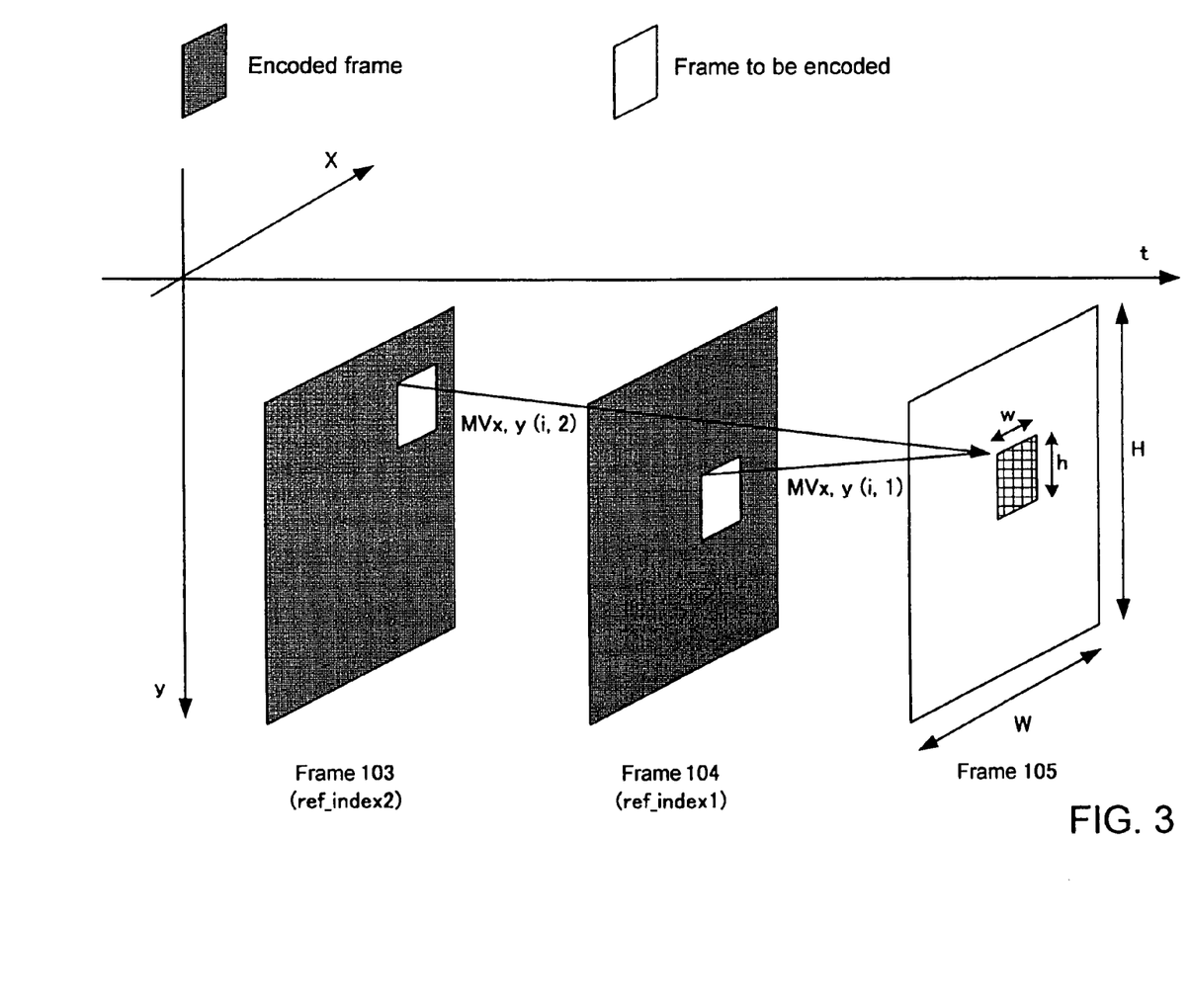
FIG. 3 is a view for explaining multi-frame motion prediction.

First, with reference to FIG. 3, explanations will be given of the motion vector and the prediction error supplied from motion estimation unit 108, and explanations will be given of generation of reference frame identification information in reference frame identification unit 110.

A number of pixels in a horizontal direction in a frame is represented by W, a number of pixels in a vertical direction is represented by H, a pixel value forming the frame to be encoded is represented by F(x,y), an index corresponding to a frame number to which a block refers for motion prediction is represented by ref_index (ref_index≦MAX_REF), a pixel value forming an encoded frame corresponding to the reference frame index ref_index is represented by R(x,y_ref_index), a size of blocks which divide the frame is represented by w×h, a number assigned to a divided block in a raster scanning order from the upper-left to the lower-right of the frame is represented by i (0≦i<block_num), and coordinates of the upper-left corner of the i-th block, which are represented in the frame coordinates are (bx(i), by(i)).

Motion vectors MVx(i, ref_index), MVy(i, ref_index) and prediction error PRED_E(i, ref_index) corresponding to the reference frame index in the i-th block are given by mvx, mvy which minimize diff(mvx, mvy, ref_index) in equation (1) and by the minimum value of diff(MVx(i, ref_index), MVy(i, ref_index), ref_index).

$$diff(mvx, mvy, ref) = \sum_{k=0}^{k=w-1} \sum_{l=0}^{l=h-1} (abs(F(bx(i)+k, by(i)+l) - R(bx(i)+mvx+k, by(i)+mvy+l, ref)) \quad (1)$$

Figure 4:
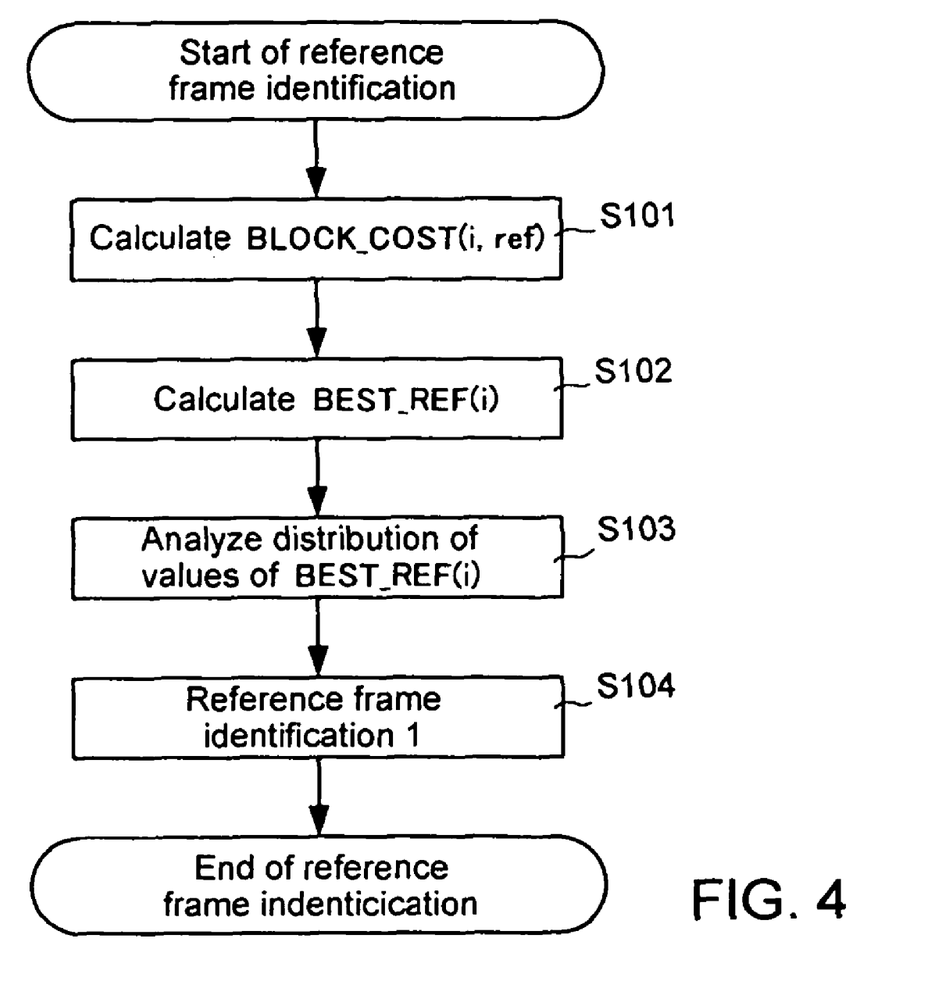
FIG. 4 is a flow chart showing a reference frame identification process.

Next, explanations will be given of an operation in reference frame identification unit 110 of the present embodiment with reference to FIG. 4.

First, in Step S101, block cost BLOCK_COST(i,r) of each block i corresponding to each reference frame r is calculated, based on equation (2), using motion vector MVx,y(i,r) and the prediction error PRED_E(i,r) supplied from motion estimation unit 108. α and β are parameters depending on a quantization step size.

BLOCK_COST(i,r)=PRED_E(i,r)+
α×(abs(MVx(i,r))+abs(MVy(i,r)))+β×r    (2)

Block cost BLOCK_COST(i,r) indirectly represents the generated code amount when reference frame frame_num(r) corresponding to reference frame index r is used for motion compensation. Also, MVx,y(i,r) may be differential vector DMVx,y(i,r) to be actually encoded.

Then, in Step S102, best reference frame index BEST_REF(i) of each block is calculated using block cost BLOCK_COST(i,r) obtained in Step S101. BEST_REF(i) is given by r corresponding to smallest BLOCK_COST(i,r) in 1≦r≦MAX_REF(i).

Subsequently, in Step S103, a distribution of values of BEST_REF(i) (reference frame index r) is analyzed. A number of reference frame indexes r is represented by NUM(r), and an initial value of NUM(r) (1≦r≦MAX_REF(i)) is set to 0. When best reference frame index BEST_REF(i) of i-th block is r, a process for incrementing NUM(r) by one is performed for from i=0 to i<block_num.

Finally, in Step S104, the reference frame identification information is calculated by the following processes.

NUM(r) (1≦r≦MAX_REF) obtained in Step S103 are selected in decreasing order of value. Numbers starting from 1 are assigned to the reference frame number frame_num(r) corresponding to NUM(r) and are stored as m_ref_index. At this time, when the number of NUM(r) is 0, NUM_REF is decremented by one. The initial value of NUM_REF is MAX_REF.

With the above-mentioned process, it is possible to calculate the reference frame number of which the generation frequency (reference frequency) is high, the update reference frame index corresponding to the reference frame number, and a number of reference frames used for the motion prediction.

Figure 5:
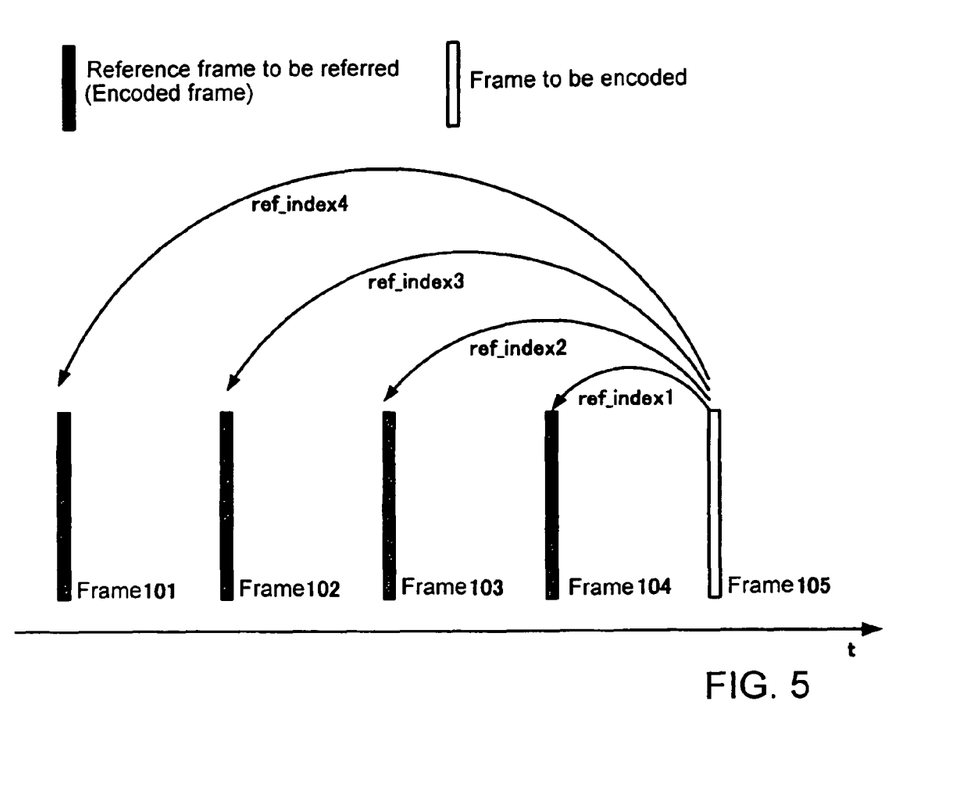
FIG. 5 is a view showing a relationship of reference frames with the motion prediction.
Figure 6:
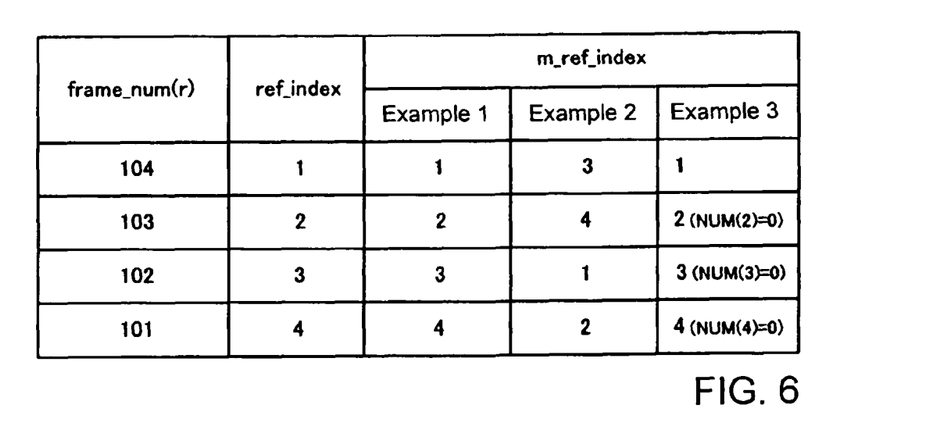
FIG. 6 is a table showing examples of correspondences between reference frames and update reference frame indexes.

FIG. 5 shows a relationship between the reference frame number and the reference frame index. When the relationship between the reference frame number and the reference frame index shown in FIG. 5 is satisfied, FIG. 6 shows update m_ref_index which is predicted to be obtained by the process in reference frame identification unit 110 in three examples as follows. Example 1 shown in FIG. 6 illustrates a case of a steady state in which there is no instantaneous fluctuation in a scene, example 2 illustrates a case in that flashes occur in frame 103 and in frame 104, and example 3 is a case in that, in spite of the steady state without instantaneous fluctuation in a scene, a motion is fast and is predicted from only frame 104.

Next, explanations will be given of variable-length encoding unit 103 of the first embodiment.

Variable-length encoding unit 103 transmits the reference frame identification information supplied from reference frame identification unit 110 to the bit stream, and also changes the variable-length code of the reference frame index transmitted every block based on the reference frame identification information. Incidentally, the generating method for the reference frame identification information is the subject of the present invention, however, the transmission method and the encoding method for the reference frame identification information are out of the present invention. Accordingly, explanations will be given how the reference frame index code transmitted every block is changed by the reference frame identification information supplied from reference frame identification unit 110.

First, explanations will be given of assignment of the reference frame index and the variable-length code thereof in a case where no reference frame identification information is signaled.

A picture frame constituting a moving picture is represented by F(i), a frame to be encoded is represented by F(cur), a frame interval is represented by t, and a frame to which the frame to be encoded refers for the motion prediction is represented by F(cur+t). In accordance with the nature of moving pictures, the smaller t, namely, the smaller frame interval, the smaller fluctuations in pixels and the more effective the motion prediction. Accordingly, the frame corresponding to the smaller t is more frequently referred for the motion prediction.

Usually, by assigning relatively shorter codes to information with higher generation frequencies and relatively longer codes to information with lower generation frequencies, information can be compressed effectively. With this technique, in the steady state of no instantaneous fluctuation in a scene, by assigning a shorter variable-length code to the reference frame index corresponding to the reference frame of which the frame interval is close, it is possible to effectively reduce a reference frame code amount transmitted for each block.

Figure 7A:
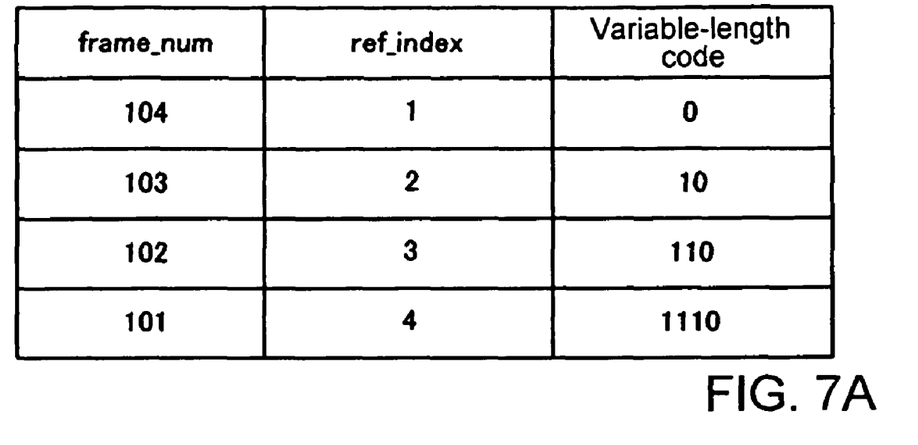
FIG. 7A is a table showing initial values of correspondences between reference frame numbers and ref_index.

As an example, FIG. 7A shows a relationship among the reference frame number, the reference frame index, and the variable-length code when the number of a current frame is 105, the maximum number MAX_REF of the reference frames is 4, and the numbers of frames to be referred are 101 to 104. In FIG. 7A, the variable-length codes are shown in binary notation.

However, it is not necessarily applied to all moving pictures that, by assigning a shorter variable-length code to the reference frame index corresponding to the reference frame of which the frame interval is close, a reference frame code amount transmitted every block can be reduced effectively.

Figure 8:
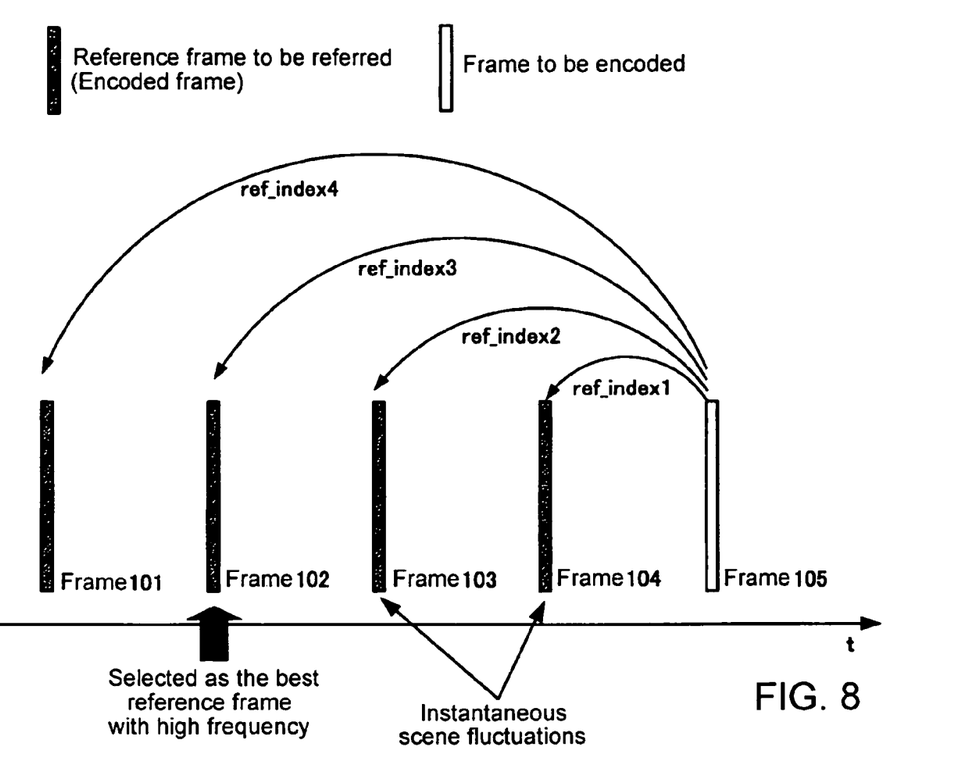
FIG. 8 is a view showing a relationship of references frame with the motion prediction.
Figure 9:
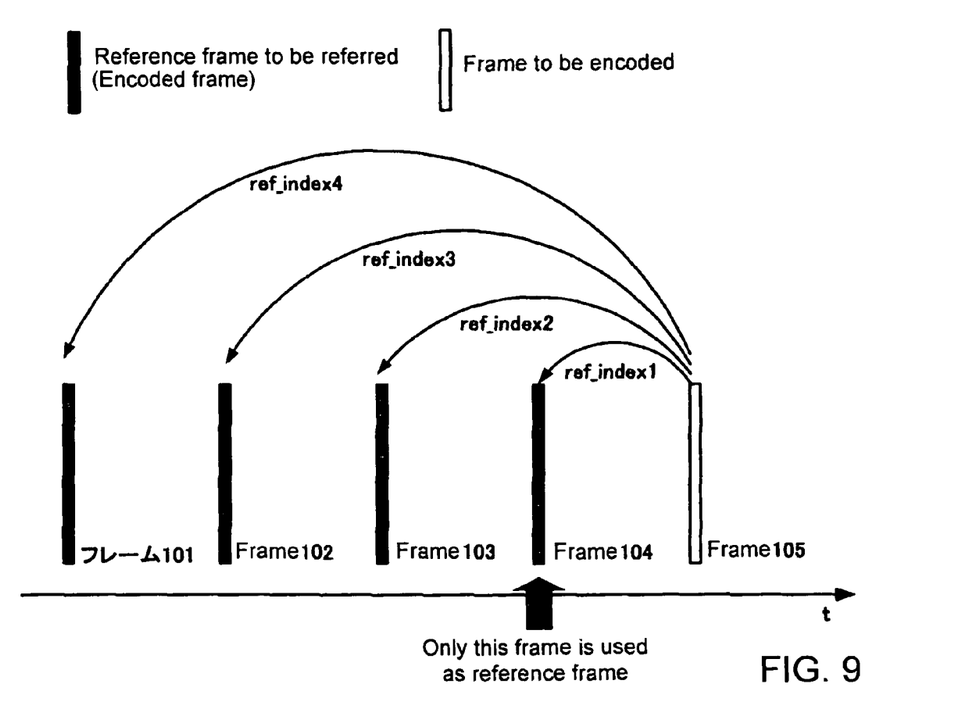
FIG. 9 is a view showing a relationship of reference frames with the motion prediction.

For example, as shown in FIG. 8, it can be considered that instantaneous scene fluctuations in moving pictures occur caused by flash or interception and the pixel value of the frame fluctuates significantly. In this case, frame 102 is selected as the reference frame with high frequency. Therefore, reference frame index 3 having the longer code generates with high frequency, and the generated code amount of the reference frame index becomes larger than that of the steady state.

Further, reference frame 102 is significantly apart from frame 105 to be encoded. For this reason, fluctuations of pixels are larger than those of the steady state, the prediction error and the motion vector length become larger, and amounts of the transform coefficient and the vector code transmitted for each block increase. Code amount control unit 109 makes the quantization parameter larger in order to maintain the increased generation code amount at the target bit rate. As a result, the picture quality of the frame deteriorates.

However, in this case, reference frame identification unit 110 in the encoding apparatus according to the present embodiment analyzes reference frames with high generation frequency as explained in Example 2 in FIG. 6 using the motion vector and the prediction error, and m_ref_index1 ⇔ frame_num 102,
m_ref_index2 ⇔ frame_num 101,
m_ref_index3 ⇔ frame_num 104,
m_ref_index4 ⇔ frame_num 103, are transmitted to variable-length encoding unit 103 as the reference frame identification information. Incidentally, "⇔" in the above expressions represents "correspond".

Figure 7B:
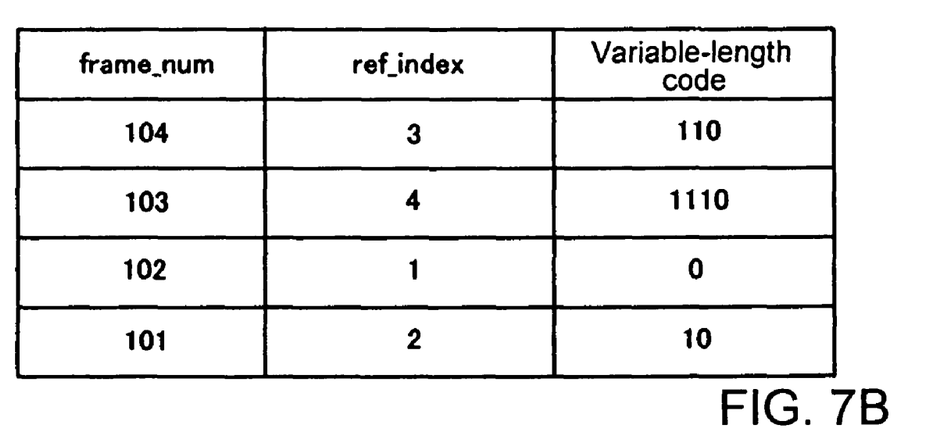
FIG. 7B is a table showing correspondences between reference frame numbers and ref_index updated according to the present invention.

Based on the reference frame identification information, variable-length encoding unit 103 can replace ref_index corresponding to frame number frame_num shown in FIG. 7A with update reference frame index m_ref_index as shown in FIG. 7B.

With this operation, a shorter variable-length code of one bit instead of the variable-length code of three bits can be assigned to frame number 102 selected as the best reference frame with high frequency, and reference frame information transmitted for each block can be reduced significantly. Also, since the code amount of the reference frame index is decreased, a ratio of the transform coefficient occupying the bit rate increases. As a result, it is possible to suppress the increase of quantization parameter and to prevent deterioration in picture quality. These advantages can be obtained not only in instantaneous scene fluctuations shown in FIG. 8 but also in a case where, in a steady and high-speed scene, a frame to be referred for the motion prediction is only a frame of frame number 104.

In this case, reference frame identification unit 110 in the encoding apparatus according to the present embodiment also analyzes reference frames with high generation frequency as explained in Example 3 in FIG. 6 using the motion vector and the prediction error, and m_ref_index1 ⇔ frame_num 104,
m_ref_index2 ⇔ frame_num 103,
m_ref_index3 ⇔ frame_num 102,
m_ref_index4 ⇔ frame_num 101, and
NUM_REF=1 are signaled to variable-length encoding unit 103 as the reference frame identification information.

In this case, variable-length encoding unit 103 can transmit a signal indicating that a number of frames to be referred is one based on that reference frame identification information NUM_REF is NUM_REF=1 and indicating that the sole reference frame is frame 104 based on "m_ref_index1 ⇔ frame_num 104" toward the bit stream. As described above, the reference frame used for the motion prediction is one, and it is unnecessary to transmit each reference frame index for each block.

As a result, the ratio of the transform coefficient occupying the bit stream increases and the size of the quantization parameter decreases, and therefore it is possible to improve picture quality of encoded moving pictures.

Next, explanations will be given of a moving picture encoding apparatus according to a second embodiment of to the present invention.

Figure 10:
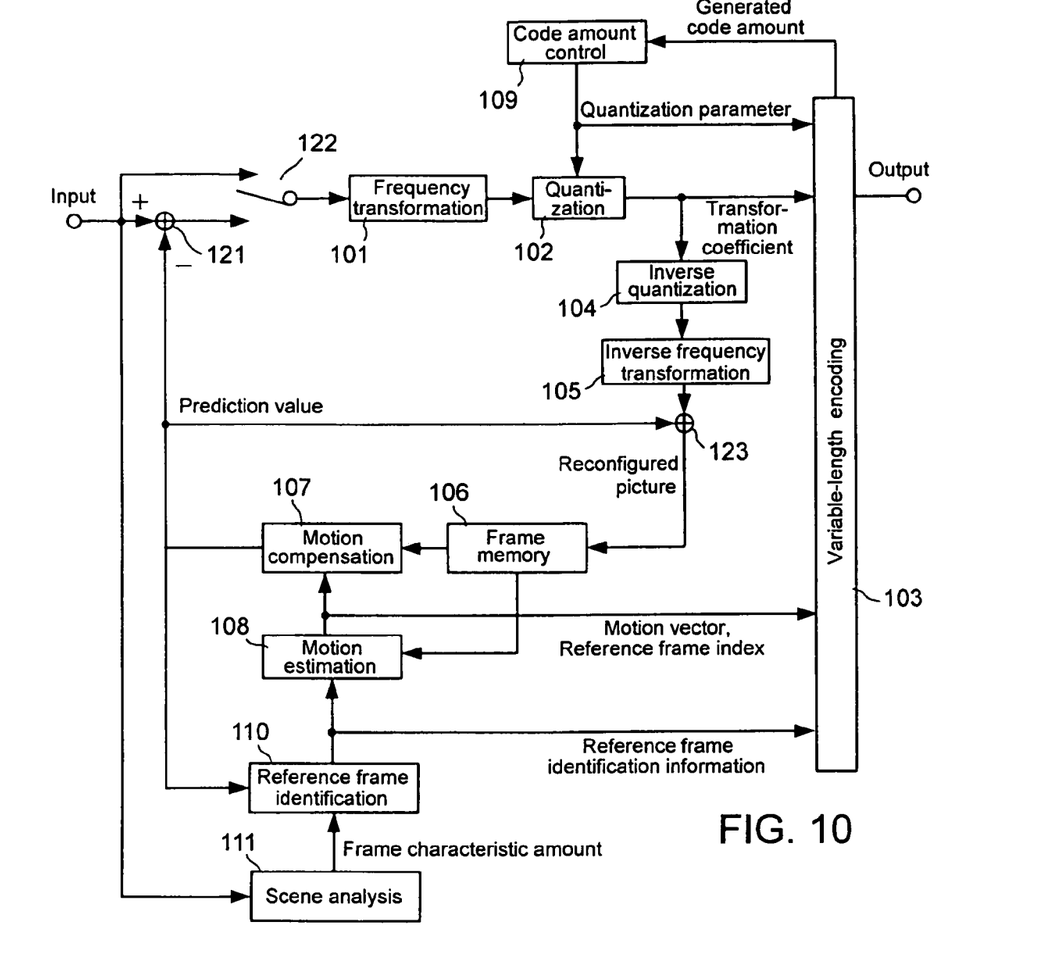
FIG. 10 is a block diagram illustrating the constitution of a moving picture encoding apparatus according to a second embodiment of the present invention.

A moving picture encoding apparatus according to the second embodiment shown in FIG. 10 is further provided with reference frame identification unit 110 and scene analysis unit 111 in addition to the encoding apparatus shown in FIG. 1. Scene analysis unit 111 calculates a frame characteristic amount from the input picture frame, and supplies the calculated frame characteristic amount to reference frame identification unit 110.

Here, the frame characteristic amount is an orthogonal transformation coefficient calculated from each input picture frame. Reference frame identification unit 110 calculates a frame similarity based on the frame characteristic amount supplied from scene analysis unit 111 and generates reference frame identification information using this frame similarity. Based on the reference frame identification information supplied from reference frame identification unit 110, variable-length encoding unit 103 determines a variable-length code corresponding to the reference frame index, and motion estimation unit 108 executes motion estimation for the reference frame designated by the reference frame identification information.

In the above-mentioned first embodiment, in order to acquire the prediction error and the motion vector required to generate the reference frame identification information, it is necessary to perform the motion estimation requiring a large computation amount. However, the orthogonal transformation coefficient can be directly calculated from the picture frame without performing the motion estimation, and, using the orthogonal transformation coefficient, calculation for generating the reference frame identification information may be performed before performing the motion estimation. In the second embodiment, the reference frame identification information is signaled to motion estimation unit 108, and motion estimation unit 108 may interrupt motion estimation for non-reference frames regarded by the reference frame identification information.

Hereinafter, explanations will be given of scene analysis unit 111 and reference frame identification unit 110 of the present embodiment. Incidentally, in the present embodiment, the operation of variable-length encoding unit 103 is similar to that of the first embodiment.

Figure 11:
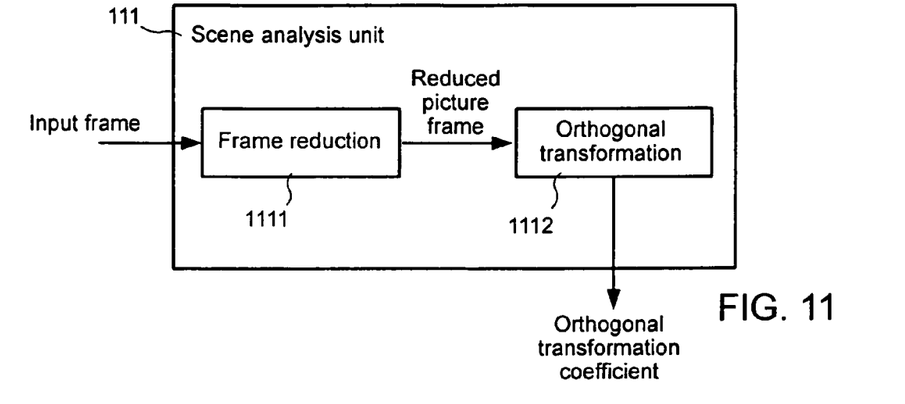
FIG. 11 is a block diagram illustrating the constitution of a scene analysis device.

As shown in FIG. 11, scene analysis unit 111 is configured with frame reduction unit 1111 and orthogonal transformation unit 1112. Hereinafter, explanations will be given of frame reduction unit 1111 and orthogonal transformation unit 1112.

Figure 12:
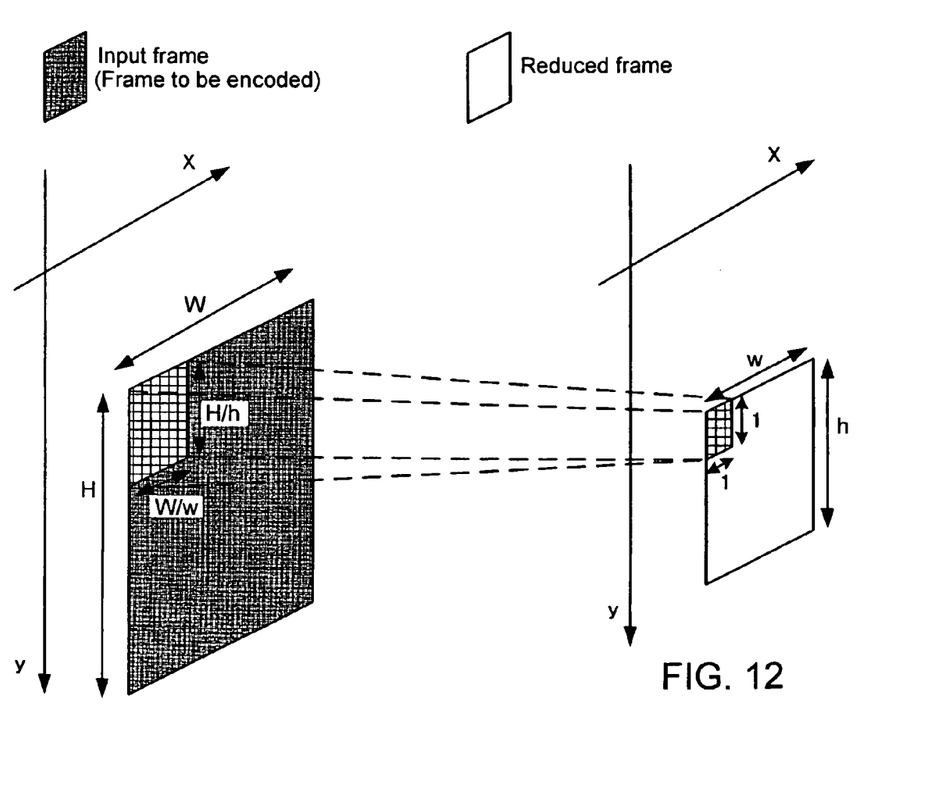
FIG. 12 is a view for explaining the generation of a reduced frame.

Frame reduction unit 1111 generates reduced frame $S(x,y)$ ($0 \leq x < w$, $0 \leq y \leq h$) from input frame $F(x,y)$ ($0 \leq x < W$, $0 \leq y < H$) using equation (3). FIG. 12 conceptually shows frame reduction.

$$F(i, j) = (1/(ww \times hh)) \times \sum_{k=0}^{k=ww-1} \sum_{l=0}^{l=h-1} F(ww \times i + k, hh \times j + l) \quad (3)$$

where ww=W/w and hh=H/h are satisfied. Hereafter, it is desirable that each value of w and h is a power of 2 for the sake of processing.

Figure 13:
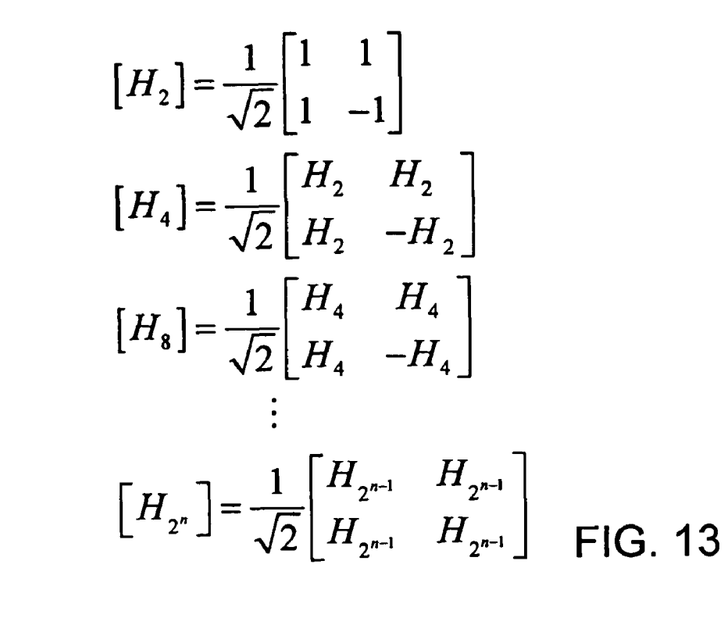
FIG. 13 is a view showing Hadamard matrices.

Orthogonal transformation unit 1112 calculates orthogonal transformation coefficient Coeff(i,j) (0≦x<w, 0≦y<h) from reduced frame S(x,y) (0≦x<w, 0≦y<h) supplied from frame reduction unit 1111.

$$Coeff = Hw \cdot S \cdot Hh \quad (4)$$

where "™" represents a product of matrix, Hw and h are Hadamard matrices represented by recurrence equations shown in FIG. 13.

Orthogonal transformation coefficient Coeff(i,j) obtained as described above represents patterns in the frame, and it is possible to check a similarity between frames by comparing orthogonal transformation coefficients of respective frames.

Additionally, in the present embodiment, the discrete Hadamard transform is used as the orthogonal transformation, however, it is needless to say that orthogonal transformations such as discrete cosine transform are available instead of the discrete Hadamard transform.

Reference frame identification unit 110 produces the reference frame identification information using the orthogonal transformation coefficients supplied from scene analysis unit 111. In this case, similarly to the first embodiment, the reference frame identification information consists of a number NUM_REF of reference frames used for the frame and a change reference frame index m_ref_index corresponding to a frame number frame_num to be referred. A number of Indexes m_ref_index is similar to maximum number MAX_REF of reference frames.

Figure 14:
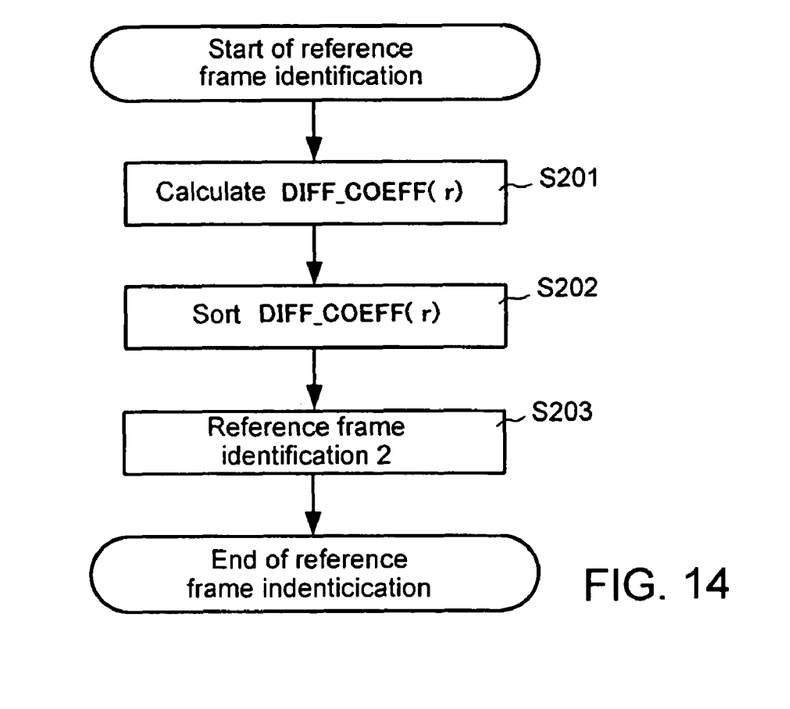
FIG. 14 is a flow chart showing a reference frame identification process.
Figure 15:
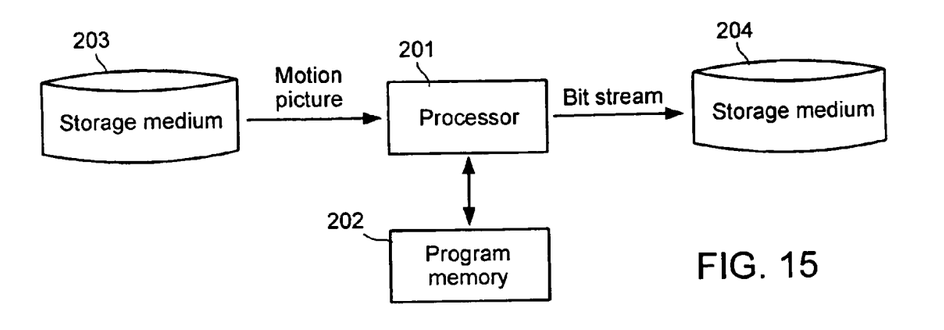
FIG. 15 is a block diagram illustrating the constitution of an information processing apparatus using the present invention.

With reference to FIG. 14, explanations will be given of the operation of reference frame identification unit 110 in the present embodiment.

A reference frame number corresponding to reference frame index r is represented by frame_num(r), an orthogonal transformation coefficient supplied from scene analysis unit 111 as to the frame to be encoded is represented by Coeff(x,y) (0≦x≦w, 0≦y<h), and an orthogonal transformation coefficient corresponding to frame_num(r)-th frame previously supplied from scene analysis unit 111 is represented by P_Coeff(frame_num(r),x,y) (0≦x<w, 0≦y<h).

First, in Step S201, in accordance with equation (5), orthogonal transformation coefficient difference DIFF_COEFF(r) is calculated as to 1≦r≦MAX_REF. A frame similarity is defined by 1/DIFF_COEFF(r). Here, c(i,j) is a weight parameter according to a frequency component in the orthogonal transformation, and d is a weight parameter for a reference frame index more than 1. When c(i,j) ($i^2+j^2 \neq 0$) is 0 in this case, the process is equal to that using an average value.

$$DIFF\_COFF(r) = \sum_{x=0}^{x=w-1} \sum_{y=0}^{y=h-1} \{c(x, y) \times (abs(Coeff(x, y) - P\_Coeff(frame\_num(r), x, y))\} + d \times r \quad (5)$$

Block cost DIFF_COFF(r) represents a pattern difference between reference frame frame_num(r) corresponding to reference frame index r and a current frame to be encoded. The smaller pattern difference the frame has, the more effective it is for the motion prediction. In other words, the smaller pattern difference the frame has, the higher reference frequency is predicted.

Then, in Step S202, DIFF_COFF(r) obtained in Step S202 are sorted in increasing order of value.

Then, in Step S203, as to DIFF_COFF(r) sorted in Step S202, numbers starting from 1 are assigned to frame numbers frame_num(r) corresponding to DIFF_COFF(r) in increasing order of value, and the assigned numbers are stored as m_ref_index. In this case, when DIFF_COFF(r) is larger than threshold T, NUM_REF is decremented by one. Incidentally, an initial value of NUM_REF is MAX_REF.

With these processes, it is possible to calculate a reference frame number of which the reference frequency is predicted to be high and an updated reference frame index corresponding to the reference frame number.

Also, by determining threshold T in reference frame identification 2 in Step S203, namely, by determining a frame having excessively different inter-frame patterns as non-reference frame, it is possible not only to decrease the reference frame index code amount but also to reduce times of motion estimation not required to improve an encoding efficiency. In other words, when a difference between the orthogonal transformation coefficient of the frame to be encoded and the orthogonal transformation coefficient of the reference frame is excessively large, the reference frame is a frame in which flash or interruption occurs and the motion prediction is less effective. Therefore, that reference frame is regarded as a frame not to be referred, and then reference frame identification information can be produced. By interrupting the motion estimation for the frame regarded as a frame not to be referred by the reference frame identification information, it is possible not only to decrease the code amount of the frame indexes but also to reduce execution times of the motion estimation of which a computation amount is large.

In the first and second embodiments, the reference frequency is calculated or estimated for the entire reference frame, however, the reference frequency may be calculated or estimated limitedly to a partial area in the reference frame in the present invention.

The above-mentioned moving picture encoding apparatus according to the present invention may be hardware as apparent from the above explanations, and may be also carried out by a computer program.

FIG. 13 is a block diagram showing a general configuration of an information processing system in which a moving picture encoding apparatus according to the present invention is implemented.

The information processing system is provided with processor 210, program memory (main memory) 202, and storage media 203, 204. Storage media 203, 204 may be separated storage media and may be individual storage areas in one storage medium. As a storage medium may be a magnetic storage medium such as a hard disk.

Then, a program for causing the information processing system to execute the above-mentioned moving picture encoding process is stored in program memory 202, and processor 210 executes the program. The information processing system thereby functions as the above-mentioned moving picture encoding apparatus. The input moving picture data is previously stored in storage medium 203, and the bit stream after encoding is stored in storage medium 204.

Therefore, the present invention also includes a program for causing a computer to execute the moving picture encoding process according to the present invention, a computer readable storage medium stored with such a program, and a program product made from the program.

Concretely, a computer program included in the present invention may be a program for causing a computer which executes moving picture encoding capable of using the reference frame number in the multi-frame motion prediction and the variable-length code reference frame identification information corresponding to the number, to execute a process for acquiring reference frequency of the reference frame, a process for acquiring the reference frame identification information so that the ratio of the reference frame index code occupying the bit stream is reduced, and a process for multiplexing the reference frame identification information together with the encoded moving picture data.

In this program, the process for acquiring reference frequency may be a process for calculating the reference frequency or a process for calculating the frame similarity, thereby estimating the reference frequency of the reference frame. The process for acquiring the reference frame identification information may be a process for, based on the reference frequency, assigning a relatively shorter code to the reference frame index code of the reference frame referred with relatively high frequency and assigning a relatively longer code to the reference frame index code of the reference frame referred with relatively low frequency, thereby acquiring the reference frame identification information. Calculation or estimation of the reference frequency may be executed for the entire frame or for a part of the frame.

When the reference frequency is acquired by calculation, a reference frame for each block may be obtained from the prediction error and a weighted sum of the motion vector and the reference frequency of the obtained reference frame may be calculated.

The process for acquiring the reference frequency by estimation may include a process for extracting an orthogonal transformation coefficient from the picture frame and calculating the frame similarity, and a process for estimating the reference frequency from the frame similarity. When the reference frequency is acquired by estimation, a process for detecting a reference frame in which frame similarity is excessively low and a process for regarding the detected reference frame as non-reference frame may be executed.

In each above-described embodiment, in moving picture encoding which uses the multi-frame motion prediction capable of transmitting the reference frame number used for the motion prediction and the reference frame identification information indicating correspondences of the reference frame index, the reference frame identification information is calculated so that the ratio of the reference frame index code occupying the bit stream is as small as possible, and the reference frame identification information is signaled in the bit stream.

The reference frequency can be calculated by acquiring the reference frame of each block based on the prediction errors and the sum of weights of the motion vector. Accordingly, it is possible to produce the reference frame identification information for assigning a relatively shorter code to the reference frame index code of the reference frame referred with relatively high frequency and assigning a relatively longer code to the reference frame index code of the reference frame referred with relatively low frequency and to reduce the reference frame index code amount occupying the bit stream.

As a result, it is indirectly possible to raise the ratio of the transformation coefficient in the bit stream to make the quantization parameter small. Accordingly, moving pictures can be encoded with high picture quality.

The invention claimed is:

1. A moving picture encoding method capable of using a reference frame number in multi-frame motion prediction and variable-length code reference frame information corresponding to the number, said method comprising the steps of:
acquiring a reference frequency of the reference frame;
with the reference frequency, acquiring reference frame identification information so that a ratio of a reference frame index code occupying a bit stream is reduced; and
multiplexing the reference frame identification information together with encoded moving picture data,
wherein the step of acquiring the reference frequency comprises a step of calculating a frame similarity to estimate the reference frequency of the reference frame.

2. The moving picture encoding method according to claim 1, wherein the step of acquiring the reference frame identification information comprises a step of assigning, based on the reference frequency, a relatively shorter code to the reference frame index code of a reference frame referred with relatively high frequency and assigning a relatively longer code to the reference frame index code of a reference frame referred with relatively low frequency, thereby acquiring the reference frame identification information.

3. The moving picture encoding method according to claim 1 or 2, wherein the step of estimating the reference frequency comprises the steps of: extracting an orthogonal transformation coefficient from a picture frame to calculate the frame similarity; and estimating the reference frequency from the frame similarity.

4. The moving picture encoding method according to claim 1, further comprising the steps of:
detecting a reference frame of which the frame similarity is excessively low; and
regarding the detected reference frame as a non-reference frame.

5. The moving picture encoding method according to claim 1, wherein the reference frequency is estimated as to all of the reference frame.

6. The moving picture encoding method according to claim 1, wherein the reference frequency is estimated as to a part of the reference frame.

7. A moving picture encoding apparatus capable of using a reference frame number in multi-frame motion prediction and variable-length code reference frame information corresponding to the number, said apparatus comprising:
reference frame identification information calculation means for calculating a frame similarity to estimate a reference frequency of the reference frame and for acquiring, with the reference frequency, reference frame identification information so that a ratio of a reference frame index code occupying a bit stream is reduced; and
multiplexing means for multiplexing the reference frame identification information together with encoded moving picture data; and
reference frame identification information calculation means for calculating a frame similarity to estimate a reference frequency of the reference frame and for, with the reference frequency, acquiring reference frame identification information so that a ratio of a reference frame index code occupying a bit stream is reduced;
multiplexing means for multiplexing the reference frame identification information together with encoded moving picture data.

8. The moving picture encoding apparatus according to claim 7, wherein the reference frame identification calculation means comprises means for, based on the reference frequency, assigning a relatively shorter code to reference frame index code of a reference frame referred with relatively high frequency and assigning a relatively longer code to the reference frame index code of a reference frame referred with relatively low frequency, thereby acquiring the reference frame identification information.

9. The moving picture encoding apparatus according to claim 7, wherein in estimation of the reference frequency, an orthogonal transformation coefficient is extracted from a picture frame to calculate a frame similarity, and the reference frequency is then estimated from the frame similarity.

10. The moving picture encoding apparatus according to claim 7, wherein in estimation of the reference frequency, calculation is performed while a reference frame of which the frame similarity is excessively low is regarded as a non-reference frame.

11. The moving picture encoding apparatus according to claim 7, wherein in estimation of the reference frequency, the reference frequency is estimated as to all of the reference frame.

12. The moving picture encoding apparatus according to claim 7, wherein in estimation of the reference frequency, the reference frequency is estimated as to a part of the reference frame.

13. A program causing a computer to execute processes, said computer executing moving picture encoding capable of using a reference frame number in multi-frame motion prediction and variable-length code reference frame information corresponding to the number, said processes comprising:
   a process for acquiring a reference frequency of the reference frame;
   a process for, with the reference frequency, acquiring reference frame identification information so that a ratio of a reference frame index code occupying a bit stream is reduced; and
   a process for multiplexing the reference frame identification information together with encoded moving picture data,
   wherein the process for acquiring the reference frequency includes a process for calculating a frame similarity and for then estimating the reference frequency of the reference frequency.

14. The program according to claim 13, wherein the process for acquiring the reference frame identification information comprises a process for assigning, based on the reference frequency, a relatively shorter code to the reference frame index code of a reference frame referred with relatively high frequency and assigning a relatively longer code to the reference frame index code of a reference frame referred with relatively low frequency, thereby acquiring the reference frame identification information.

15. The program according to claim 13 or 14, wherein the process for estimating the reference frequency comprises: a process for extracting an orthogonal transformation coefficient from a picture frame to calculate the frame similarity; and a process for estimating the reference frequency from the frame similarity.

16. The program according to claim 13 further causing the computer to execute:
   a process for detecting a reference frame of which the frame similarity is excessively low; and
   a process for regarding the detected reference frame as a non-reference frame.

17. The program according to claim 13, wherein, in the process for estimating the reference frequency of the reference frame, the reference frequency is estimated as to all of the reference frame.

18. The program according to claim 13, wherein, in the process for estimating the reference frequency of the reference frame, the reference frequency is estimated as to a part of the reference frame.

* * * * *